C. H. MEYER.
ROLLER ATTACHMENT FOR SLEDS.
APPLICATION FILED MAY 4, 1921.
1,412,413. Patented Apr. 11, 1922.
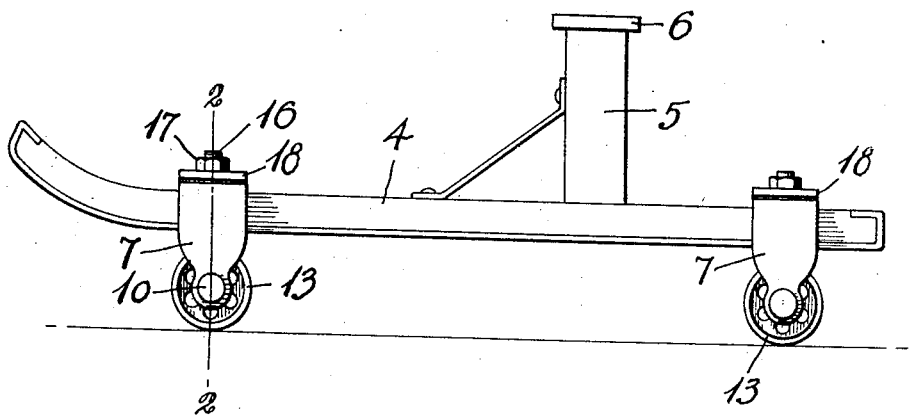
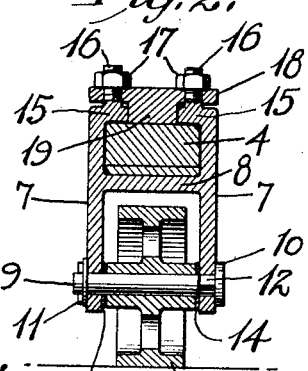
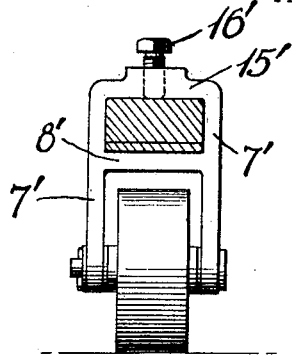
Inventor
C. H. Meyer,
By W. J. FitzGerald & Co.
Attorney

UNITED STATES PATENT OFFICE.

CARL H. MEYER, OF WASHINGTON, PENNSYLVANIA.

ROLLER ATTACHMENT FOR SLEDS.

1,412,413. Specification of Letters Patent. Patented Apr. 11, 1922.

Application filed May 4, 1921. Serial No. 466,816.

*To all whom it may concern:*

Be it known that I, CARL H. MEYER, a citizen of the United States, residing at Washington, in the county of Washington and State of Pennsylvania, have invented certain new and useful Improvements in Roller Attachments for Sleds; and I do hereby declare the following to be a full, clear, and exact description of the invention, such as will enable others skilled in the art to which it appertains to make and use the same.

The present invention relates to roller attachments for sleds, and aims to provide novel and improved devices attachable to the runners of sleds for supporting same on wheels or rollers, in order that the sleds can be used on the sidewalks, streets, and other surfaces when same are not covered with snow or ice, thereby enabling a sled to be used summer and winter, or in all seasons.

Another object is the provision of such an attachment which is extremely simple and light in construction and cheap to manufacture, as well as being easily applied to and removed from a sled runner, and not being apt to get out of order.

A further object is the provision of a device of the kind indicated which has novel means for clamping it on the runner of the sled.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a side elevation of a sled showing a pair of the attachments applied.

Fig. 2 is an enlarged cross section on the line 2—2 of Fig. 1, portions being shown in elevation.

Fig. 3 is an elevation of a modified form of attachment, showing the sled runner in cross section.

The attachments may be used with various kinds of sleds for which the attachments are suited, and, as shown, the devices are used in connection with a single runner or "jumper" sled, which is well known. The sled illustrated has the single runner 4 on which a post 5 is supported, having a seat 6 thereon, and the rider either sits on the seat or stands on the runner for coasting down hill or propelling the sled in the usual fashion. Such sleds, of course, can only be used on snow and ice, and are laid away at other times.

The present attachments are designed for application to the runners of such sled and others to enable the sled to be used throughout the year.

The devices are duplicates, and a pair of them is used for each runner. Each device includes the vertical side plates 7 connected between their upper and lower ends by a cross piece or yoke 8 cast or formed integral with said plates. An axle 9 extends transversely through the plates 7 below the yoke 8 near the lower ends of the plates 7, and is preferably in the form of a pin having a head 10 at one end, and a cotter pin or retaining element 11 at the other end. The axle has a square or non-circular portion 12 adjacent to head 10 to fit on a similarly-shaped hole in the corresponding plate 7, to keep the axle from turning. A suitable wheel or roller 13 is mounted for rotation on the axle between the side plates, and washers 14 are preferably disposed on the axle between said plates and the hub of the wheel or roller.

In order to retain the device on the runner 4, the upper ends of the plates 7 have lips or flanges 15 extending inwardly toward one another from the upper ends of said plates, to overlap the top surface of the runner, and the yoke 8, upper portions of the plates 7 and flanges 15 form means to embrace the runner when such runner engaging and embracing means is slid onto the runner from either end thereof. The flanges 15 have upstanding threaded studs 16, on which nuts 17 are screwed, and a clamping plate 18 is fitted on said studs under the nuts, and has a depending lug 19 depending between the flanges 15 to bear on the runner.

When the nuts 17 are loosened, to loosen the clamping plate or block 18, the device can be readily slid onto or off of the runner, and when properly positioned on the runner and the nuts 17 tightened, the runner will be clamped between the yoke 8 and lug 18. The lug 18 is coextensive in length with the flanges 15, or is of a length equal to the width of plates 7 and yoke 8, whereby the device in clamping the runner, will be held firmly in position thereon without the liability of the device becoming loosened or tilting out of position.

In using the roller attachments, one of them is slipped over each end portion of the runner, as seen in Fig. 1, and then clamped in place. The sled can then be used, in the absence of snow and ice, for coasting and gliding on sidewalks, pavements, and other surfaces, for the amusement and entertainment of children. The attachments thereby enable the sled to be used throughout the year, in all seasons. The devices are readily attached to the sled for the use of the wheels or rollers, and are readily removed when there is snow and ice. In applying and removing the devices, it is unnecessary to remove the nuts 17 or other securing means, thereby eliminating the possibility of losing any of the parts.

A modified construction is shown in Fig. 3 wherein the side plates 7' have their upper ends connected by a yoke 15' passing over the runner, while the yoke 8' passes under such runner, and a set screw 16' is threaded downwardly through the yoke 15' to clamp the device in place.

Having thus described the invention, what is claimed as new is:—

1. A device of the kind described comprising a pair of side plates having a yoke rigidly connecting them between their ends to bear upwardly against a runner with the upper portions of said plates at the opposite sides of said runner, a wheel or roller mounted between said plates below said yoke, the upper ends of said plates having rigid means above said yoke to be disposed over said runner when the device is slid longitudinally on the runner, and clamping means carried by the aforesaid means and including a vertically movable member to bear down on the runner below the first named means between the side plates for clamping the yoke up against the runner.

2. A device of the kind described comprising a pair of side plates having a yoke connecting them, a wheel or roller mounted below said yoke, said plates having flanges above the yoke to overlap a sled runner, a clamping plate above the yoke having a portion to bear on the runner between said plates, and means carried by the flanges for clamping the last named plate against the runner.

3. A device of the kind described comprising a pair of side plates having a yoke connecting them, a wheel or roller mounted below said yoke, said plates having flanges above said yoke to overlap a sled runner, said flanges having upstanding studs, a clamping plate fitted on said studs, and having a lug depending between said flanges to bear on said runner, and nuts threaded on said studs.

In testimony whereof I have signed my name to this specification in the presence of two subscribing witnesses.

CARL H. MEYER.

Witnesses:
J. W. GORDON,
P. G. CARTER.